July 2, 1968  J. E. COUTTET ET AL  3,390,640
SUBMARINE CABLE TRANSPORTER SYSTEM
Filed July 23, 1964  3 Sheets-Sheet 1

Inventors
JAMES EDOUARD COUTTET
DENIS C. CREISSELS

By Stevens, Davis, Miller & Mosher
Attorneys

July 2, 1968   J. E. COUTTET ET AL   3,390,640
SUBMARINE CABLE TRANSPORTER SYSTEM
Filed July 23, 1964   3 Sheets-Sheet 2
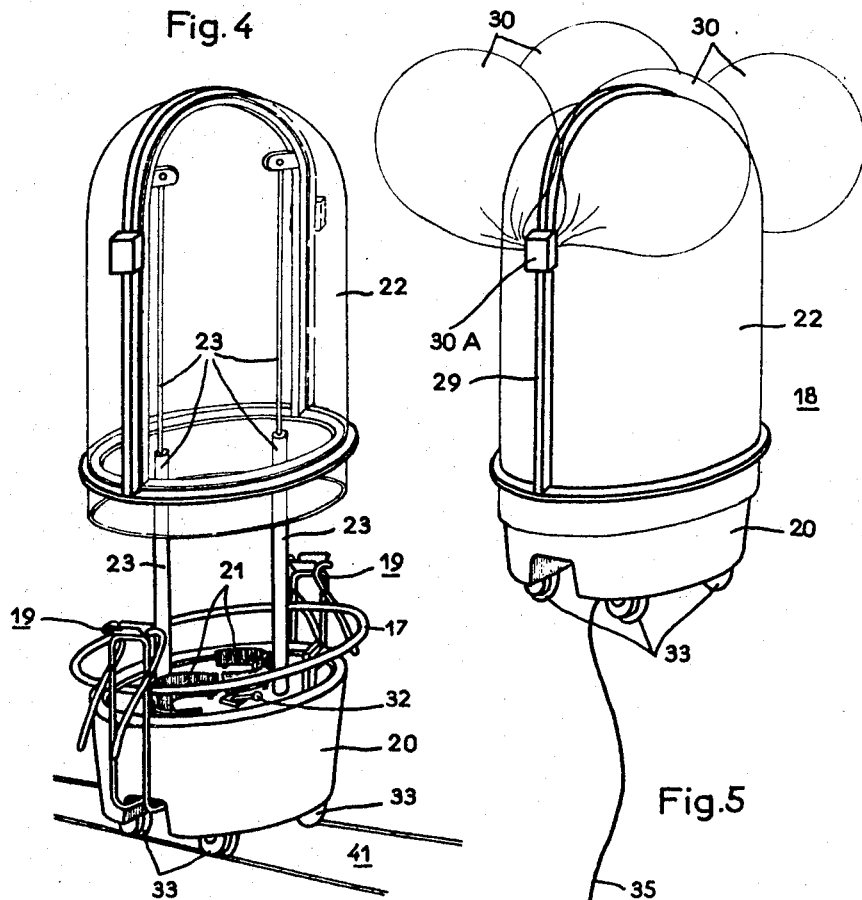
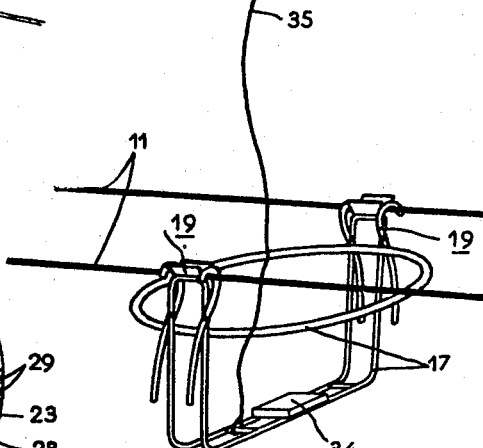
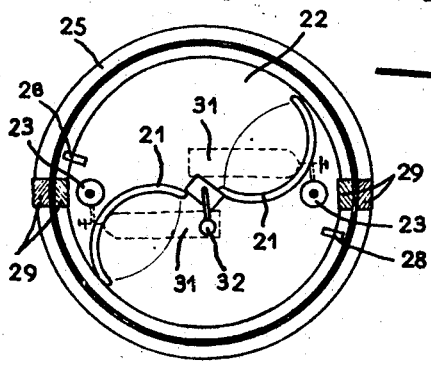
Inventors
JAMES EDOUARD COUTTET
DENIS C. CREISSELS
By Stevens, Davis, Miller & Mosher
Attorneys July 2, 1968   J. E. COUTTET ET AL   3,390,640
SUBMARINE CABLE TRANSPORTER SYSTEM
Filed July 23, 1964   3 Sheets-Sheet 3
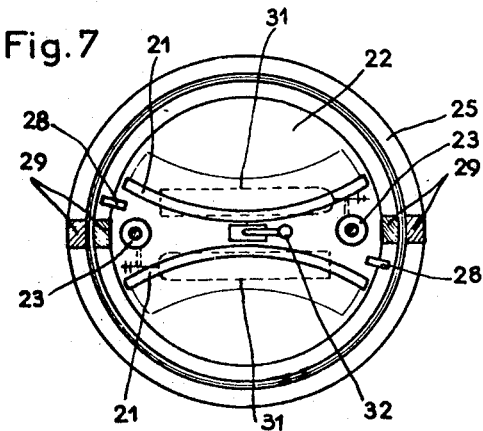
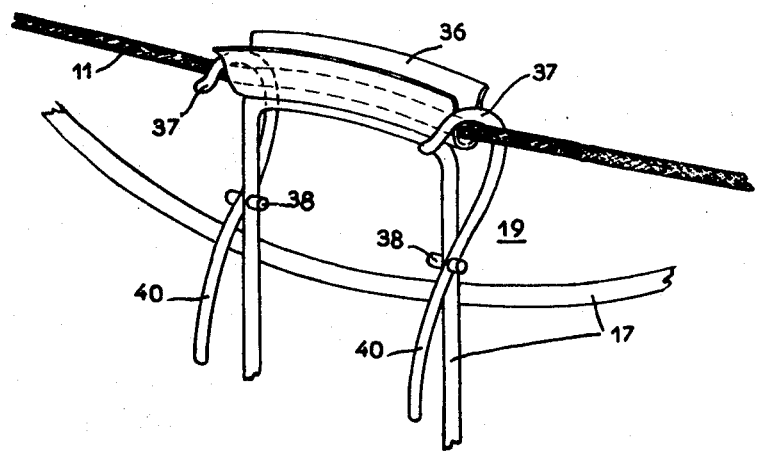
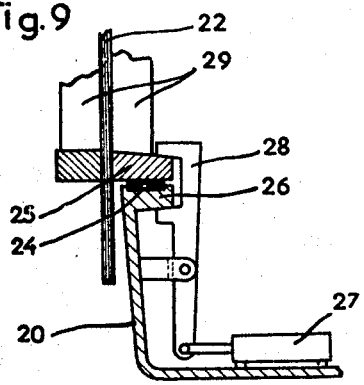
Inventors
JAMES EDOUARD COUTTET
DENIS C. CREISSELS
By Stevens Davis Miller & Mosher
Attorneys

United States Patent Office 3,390,640
Patented July 2, 1968

3,390,640
SUBMARINE CABLE TRANSPORTER SYSTEM
James Edouard Couttet, Quai de l'Arve, and Denis C. Creissels, Le Metropole, both of Chamonix, France
Filed July 23, 1964, Ser. No. 384,659
Claims priority, application France, July 26, 1963, 942,903
21 Claims. (Cl. 104—71)

The invention relates to a submarine passenger transporter comprising traction cable means driving at least one water-tight vehicle designed for the transport of passengers under water, part of the wall of the vehicle being transparent to afford the passengers visibility of submarine life, e.g., in lakes or along seashores.

It is an object of the invention to provide a submarine cable transporter wherein the vehicles are driven with greatest stability.

According to another object of the invention the vehicle guide-system is simplified to the utmost while no propelling or control system such as ailerons or propellors is required on the vehicles to adjust the depth of immersion of the vehicles.

Another object of the invention is to afford maximum comfort to the passengers.

Still another object of the invention is to ensure the safety of the passengers in case of failure or emergency.

A further object of the invention is to simplify to the utmost the embarcation and landing operations of the passengers.

These and other objects and features will appear from the following description of a preferred embodiment of the invention shown on the accompanying drawing in which:

FIGURE 4 is a perspective view of a vehicle, the dome being in raised position.

FIGURE 5 is a perspective view of a vehicle in emergency case, the housing being separated from its framework.

FIGURES 6 and 7 are diagrammatic plan views showing two possible arrangements of the housing.

FIGURE 8 is an enlarged perspective view of a gripping device for coupling a vehicle to the cables.

FIGURE 9 is a sectional view of a detail of the sealing arrangement between the dome and the chair member.

Figure 1:
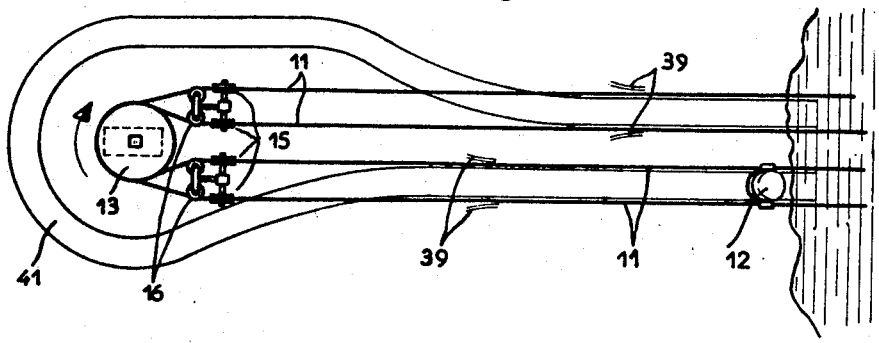
FIGURE 1 is a diagrammatic plan view of one end station of an installation according to the invention.
Figure 2:
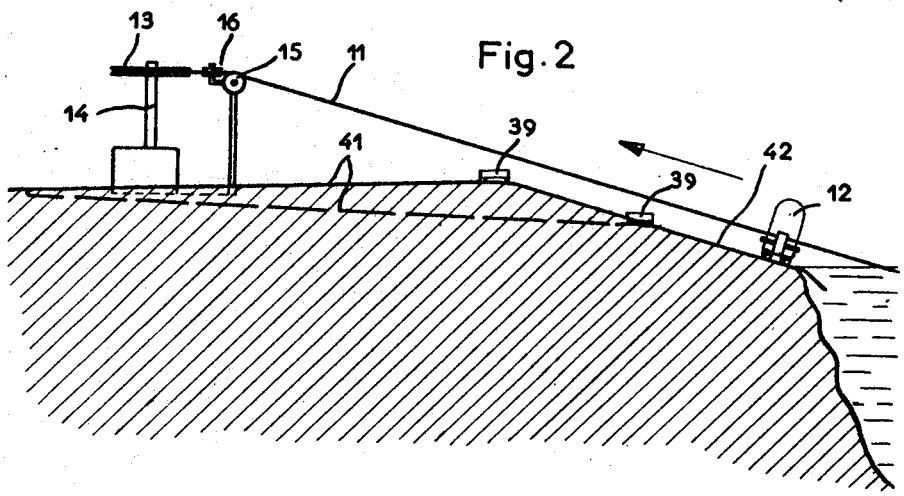
FIGURE 2 is an elevation of the part shown in FIGURE 1.
Figure 3:
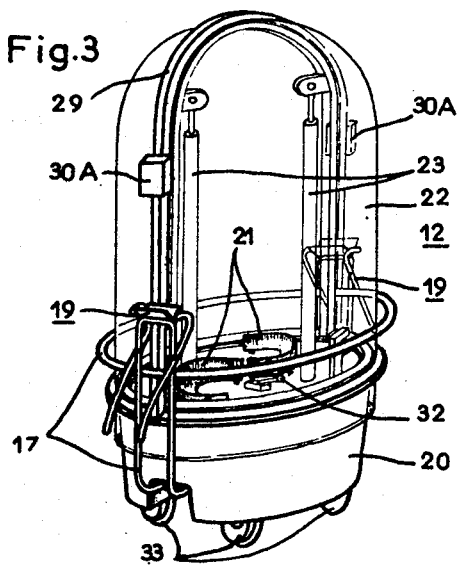
FIGURE 3 is a perspective view of a vehicle in elevation in operative position.

The installation comprises two terminal stations located out of the water, one end station 10 being visible on FIGURES 1 and 2, two parallel cables 11 connecting the two stations so as to define the trajectory of the vehicles 12. The movable cables 11 pass over a pulley 13 in each terminus, one of the pulleys being the drive pulley of the cables, itself driven by a motor, the other pulley tensioning the cables. Under water the two cables 11 are in the same horizontal plane and in the end stations they pass together over the pulleys 13 which have two grooves, one for each cable. The pulleys 13 are supported by frameworks 14 and are high enough above ground level for the cables to disengage the gripping means when the same are released as will be explained hereafter.

Compression sheaves 15 support the cables 11 at the two end stations and spacing sheaves 16 keep the cables spaced apart to allow the vehicles 12 to pass between them. If necessary the cables which hang freely in the water between the compression sheaves can be protected by anti-corrosive sheathing.

According to the invention the resultant of the force exerted by the cables on each vehicle passes approximately through its center of pressure in the traction direction, that is through the point of application on the vehicles of the hydrodynamic resultant representing the resistance due to the water on the hull of the vehicle, which ensures high stability of the vehicle, particularly in case of turbulence.

According to a further important characteristic of the invention the cables 11 are both driving and supporting, that is they both drive and guide the vehicles under water.

This arrangement in which the ropes are both driving and supporting is advantageous since the resistance offered by the water to the vehicles, is far from being negligible, so that in order to avoid rocking the vehicle, the points where bearing and pulling forces are applied should be as close as possible.

Although the arrangement with two parallel cables disposed in the same horizontal plane appears to be the most advantageous, it is obviously possible to use more than two cables which however should be arranged in such a way that the forces are applied at the center of pressure of the vehicles.

Several vehicles 12 are driven by the ropes. Each vehicle 12 is composed of two separable parts placed one above the other, the lower part or framework 17 being designed to support the upper part or housing 18 and comprising the gripping means 19 for coupling the vehicle 12 to the cables 11 described hereafter. The housing 18 is designed for carrying the passengers and is composed of two parts: a gondola or chair member 20 fitted with seats 21 and a fully transparent dome 22 affording visibility of submarine life to the passengers. The chair member 20 is made of metal so as to provide a rigid and sturdy base for the dome 22 and also to lower the center of gravity of the assembly.

Each dome 22 may slide vertically by means of one or more telescopic jacks 23 mounted internally or externally to the dome 22 and which may be controlled pneumatically. The dome 22 may be closed hermetically over the chair member 20 by means of a seal arrangement well-known in the art, for example in submarine techniques. The seal 24 which is squeezed between a ring 25 mounted on the dome 22 and a flange 26 of the chair member 20 is compressed by means of mechanical clamping or any other appropriate system, for example by means of pneumatic jacks 27 acting by design on a clamp 28.

The seats 21 may be arranged back-to-back so as to take full advantage of the available space (two seats placed side by side for two-seater vehicles (FIG. 6) or rounded double bench-seats for four-seater vehicles (FIG. 7)). The housings 18 have the smallest possible volume so as to limit the ballast (carried or constituted by the framework 17) since it has been noted that in most cases the minimum internal volume required to seat the passengers is sufficient to avoid the necessity of regenerating the air.

The dome 22 can close the chair member 20 hermetically at an adjustable height if the seal is placed at the side of the dome. In this manner the volume of air within the cabins can be adapted to the number of passengers transported. It is also possible to load the vehicles with ballast according to the weight transported. In all cases the specific weight of the vehicles should be greater than that of water so as to eliminate a raising force exerted by the vehicles on the cables. The plastic dome 22 is reinforced inside and outside by metal ribs 29 particularly in the plane normal to the direction of travel. For the event of equipment failure or other emergencies and to allow the vessel to float, deformable enclosures consisting of balloons 30 are located at 30A in the ribs 29 in such a way that the balloons 30 may be inflated by means of compressed air cylinders 31 located beneath the seats 21 and which can be turned on by a lever 32 within the housing 18.

The chair member 20 is fitted with four wheels 33 enabling the vehicles 12 to travel on the ground at the end stations. The framework 17 bears the gripping means 19 for coupling or uncoupling the vehicle 12 and the cables 11 at will at any point of the latter. The framework 17 may be formed by an assembly of welded tubes in which the housing 18 may be fitted. Securing means are provided for connecting the housing 18 to the framework 17. These means may profitably be formed by a magnetic circuit comprising a magnetic plate 34 fixed to the framework 17 and a variable reluctance element (not shown) on the chair member 20. A permanent magnet (not shown) excites the circuit thus creating an attraction force which holds the chair member 20 in contact with the framework 17. The reluctance of the magnetic circuit may be adjusted manually from within the housing 18 preferably by means of the lever 32 which controls the inflation of the balloons 30.

A coil of cord 35 with one end attached to the framework 17 and the other to the housing 18 forms a flexible connection between these parts so as to avoid housing drift when the latter rises to the surface in case of emergency.

The gripping means may be devices known in the art, acting, for example through clamping the cable between two jaws by an elastic means (springs, spring washers), through rocking, through belaying of the cable, through direct magnetization of the cable, etc. Whatever device may be employed, the cable must be able to escape upwards when uncoupled from the vehicle so as to be able to engage the pulleys 13 directly at the end stations 10.

In one embodiment of the invention (FIG. 8) a fixed support member for the cable constituted by a flared groove 36 and two movable grips 37 on either side of the former are provided on the framework so that the cable 11 is deviated or kinked several times.

These deviations of the cable 11 are produced in a vertical plane, the grips 37 which are pivotably mounted on hinges 38 maintaining the cable downward.

When the vehicle arrives at the end station, rails 39 act on arms 40 of the grips 37 which then become inoperative through pivoting about the hinges 38.

At each end of their travel, when the vehicles 12 are uncoupled from the cables 11 they engage upon an inclined track 41 in the form of a loop around the end pulley 13 in such a way that they may move to the point where they will be coupled to the cables simply under gravity as the track 41 is downhill over all this portion out of the water.

The transporter operates as follows:

The vehicle 12 is originally at a certain point on the inclined track 41 with the dome 22 opened. The passengers embark and sit down on the seats 21 of the chair member 20. By opening a decompression valve (not shown) the dome 22 closes slowly over them, compressing the seal 24 hermetically and the clamping means 27 and 28 are actuated to apply the dome 22 tightly on the seal 24. The vehicle 12 is then freed on the inclined track 41 to meet the cables 11, its speed being then approximately that of the cables which move continuously. The little side rails 39 which position the grips 37 engage the arms 40 of the latter so that the grips close and grip the cables 11 by imparting to them sinusoidal deviations. The vehicle 12 is then firmly fixed to the cables 11 which pull it below water until it surfaces again close to the other end station. The vehicle 12 is then engaged on the inclined track 41 along which it travels and arrives at a hump-back 42 fitted with rails 39 for uncoupling the vehicles 12. The said rails 39 engage the grips 37 and open them. The vehicle is then on the downhill track 41 and the cables 11 escape upward. The vehicle being freed from the cables which re-engage the end pulley 13 is then stopped and a flexible pipe connected to a compressed air source is coupled to the pneumatic circuit of the housing to cause the dome 22 to rise after unclamping the seal compressing jacks 27. The passengers alight and others embark after which the vehicle is released in order to be recoupled to the cables.

In the case of emergency, for instance in the case of a prolonged halt of the vehicles under water or in case of water leakage into the housings 18, the passengers operate the safety lever 32 which both controls the uncoupling of the housing 18 and the framework 17 (the latter remaining fixed to the cables 11) on the one hand and the progressive inflation of the safety balloons 30 on the other hand.

The flow of air is pre-set so that the housing 18 progressively loses specific weight and leaves the framework 17 without jolting the cables 11 and surfaces at a reasonable speed. The balloons 30 thus ensure both the buoyancy and the stability of the emerging housing 18 which moreover remains connected to its framework 17 by means of the cord 35 in order to avoid housing drift and to enable the housing to be returned to the terminal station by operating the cables 11.

What is claimed is:

1. A submarine passenger transporter comprising a plurality of submersible vehicles, each vehicle having a transparent wall portion, two substantially parallel horizontally spaced traction cables movable along stationary rotating guide sheaves, a releasable gripping device on each vehicle for securely gripping said traction cables at both sides of the vehicle, said cables guiding said vehicle under water so as to determine its submersion depth.

2. A submarine passenger transporter including at least two parallel endless cables serving as both traction and guiding cables, at least one water-tight submersible vehicle, gripping devices adapted for selective engagement with said cables, said gripping device being mounted on both sides of said vehicle and vertically positioned on said vehicle to cause the force exercised by said cables on said vehicle to pass substantially through the hydrodynamic center of the immersed vehicle, corresponding to the direction of traction whereby said vehicle is maintained in an upright position during submerged travel.

3. A transporter as set forth in claim 2 in which the vehicle comprises a framework on which said gripping means are mounted and a releasable watertight housing, releasable securing means being provided for securing the housing to said framework.

4. A transporter according to claim 3, wherein said releasable securing means comprise a magnetic circuit of variable reluctance and a permanent magnet one of which is fixed to the framework and the other to the housing.

5. A transporter according to claim 3, wherein each housing comprises a chair member and a transparent dome vertically displaceable with respect to said chair member and adapted to fit hermetically to the latter.

6. A transporter according to claim 3, wherein each housing further comprises at least one resilient container, a source of compressed gas, connecting means selectively connecting said container to said source and obturating means associated to said connecting means, whereby the opening of said obturating means causes said container to be inflated while simultaneously releasing said housing from said framework allowing said housing to rise to the surface.

7. A transporter according to claim 3, comprising flexible rope means between said housing and said framework, the length of said rope means allowing the housing to rise to the water surface.

8. A submarine passenger transporter including at least two parallel traction cables, at least one watertight submersible vehicle, a gripping device for each cable and disposed to engage the corresponding cable, said gripping device being mounted on both sides of said vehicle and vertically positioned on said vehicle to cause the force exercised by said cables on said vehicle to pass substantially through the hydrodynamic center of the immersed vehicle, corresponding to the direction of traction whereby said vehicle is maintained in an upright position during submerged travel.

9. A transporter as set forth in claim 8 in which the vehicle comprises a framework on which said gripping means are mounted and a hermeticaly sealed vessel and a releasable watertight housing, releasable securing means being provided for securing said housing to said framework.

10. A transporter as set forth in claim 9 wherein said vessel includes a transparent dome displaceable with respect to said chair member and adapted to fit hermetically to the latter.

11. A transporter as set forth in claim 9 wherein said vessel comprises at least one resilient container, a source of compressed gas, connecting means connecting said container to said source and obturating means associated to said connecting means, whereby the opening of said obturating means causes said container to be inflated and said housing to rise under water after it is uncoupled from said framework.

12. A transporter according to claim 9 comprising flexible rope means connecting said vessel and said framework, the length of said rope means allowing said vessel to rise to the water surface.

13. A submarine passenger transporter including at least two parallel traction and guiding cables, at least one watertight submersible vehicle, gripping devices adapted to selectively engage said cables, said gripping device being mounted on both sides of said vehicle and vertically positioned on said vehicle to cause the reaction exercised by said cables on said vehicle to pass substantially through the hydrodynamic center of the immersed vehicle, corresponding to the direction of traction whereby said vehicle is maintained in an upright position during submerged travel.

14. A transporter as set forth in claim 13 in which the vehicle comprises a framework on which said gripping means are mounted and a hermetically sealed vessel and a releasable watertight housing, releasable securing means being provided for securing said housing to said framework.

15. A transporter as set forth in claim 14 wherein said vessel includes a transparent dome displaceable with respect to said chair member and adapted to fit hermetically to the latter.

16. A transporter as set forth in claim 14 wherein said vessel comprises at least one resilient container, a source of compressed gas, connecting means connecting said container to said source and obturating means associated to said connecting means, whereby the opening of said obturating means causes said container to be inflated and said housing to rise under water after it is uncoupled from said framework.

17. A transporter according to claim 14 comprising flexible rope means connecting said vessel and said framework, the length of said rope means allowing said vessel to rise to the water surface.

18. A submarine passenger transporter including at least two parellel traction endless cables, at least one watertight submersible vehicle, gripping devices adapted to selectively engage with said cables, said gripping device being mounted on both sides of said vehicle and vertically positioned on said vehicle to cause the force exercised by said cables on said vehcile to pass substantionally through the hydrodynamic center of the immersed vehicle, corresponding to the direction of traction whereby said vehicle is maintained in an upright position during submerged travel.

19. A submarine passenger transporter including at least two parallel traction and guiding cables, at least one watertight submersible vehicle, releasable gripping devices adapted to selectively engage with said cables, said gripping device being mounted on both sides of said vehicle and vertically positioned on said vehicle to cause the reaction exercised by said cables on said vehicle to pass substantially through the hydrodynamic center of the immersed vehicle, corresponding to the direction of traction whereby said vehicle is maintained in an upright position during submerged travel.

20. A transporter as set forth in claim 18 wherein said releasable securing means comprise a magnetic circuit of variable reluctance and a permanent magnet one of which is fixed to the framework and the other of which is fixed to said housing.

21. A transporter as set forth in claim 19 wherein said releasable securing means comprise a magnetic circuit of variable reluctance and a permanent magnet one of which is fixed to the framework and the other of which is fixed to said housing.

References Cited

UNITED STATES PATENTS

| | | | |
|---|---|---|---|
| 694,486 | 3/1902 | Leps | 104—71 |
| 808,487 | 12/1905 | Stahl | 104—71 |
| 952,673 | 3/1910 | Karr | 104—72 |
| 1,056,929 | 3/1913 | Navarro | 104—71 |
| 1,167,993 | 1/1916 | Gunzendorfer | 104—71 |
| 1,799,161 | 4/1931 | Fugle et al. | 104—202 |

ARTHUR L. LA POINT, *Primary Examiner.*

F. W. MONAGHAN, H. BELTRAN,
                              *Assistant Examiners.*